(12) United States Patent
Bishop et al.

(10) Patent No.: US 6,614,798 B1
(45) Date of Patent: Sep. 2, 2003

(54) ASYNCHRONOUS FIFO INCREMENT AND DECREMENT CONTROL FOR INTERFACES THAT OPERATE AT DIFFERING CLOCK FREQUENCIES

(75) Inventors: Robert H. Bishop, Lawrenceville, GA (US); Bruce C. Grugett, Cumming, GA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 0 days.

(21) Appl. No.: 09/281,520

(22) Filed: Mar. 30, 1999

(51) Int. Cl.[7] ............................................. H04L 12/54
(52) U.S. Cl. ................................... 370/428; 370/395.7
(58) Field of Search ................................ 370/415, 418, 370/428, 429, 463, 395.1, 395.7, 395.72; 710/52–57; 711/154, 167

(56) References Cited

U.S. PATENT DOCUMENTS 5,124,977 A * 6/1992 Kozaki et al. ............... 370/392
5,136,584 A * 8/1992 Hedlund ...................... 370/399
5,157,654 A * 10/1992 Cisneros ..................... 370/414
6,128,297 A * 10/2000 Reumerman et al. ........ 370/391
6,463,485 B1 * 10/2002 Chui et al. .................... 710/52

OTHER PUBLICATIONS

Study of a High Efficient Battery Saving Control, Y. Arikawa et al., 1995 IEEE Society B–243, and translation of relevant portions.

* cited by examiner

Primary Examiner—Kwang Bin Yao
Assistant Examiner—Thai Hoang
(74) Attorney, Agent, or Firm—Myers Bigel Sibley & Sajovec

(57) ABSTRACT

A First-In-First-Out (FIFO) memory device includes a FIFO memory block, a data input interface that writes data into the FIFO memory block in synchronization with a first clock, and a data output interface that reads the data from the FIFO memory block in synchronization with a second clock. The data input interface provides a first indication to the data output interface that the received data has been written into the FIFO memory block. The first indication persists until reset by the data output interface. The data output interface provides a second indication to the data input interface that the received data has been read from the FIFO memory block. The second indication persists until reset by the data input interface.

5 Claims, 6 Drawing Sheets

US 6,614,798 B1

ASYNCHRONOUS FIFO INCREMENT AND DECREMENT CONTROL FOR INTERFACES THAT OPERATE AT DIFFERING CLOCK FREQUENCIES

FIELD OF THE INVENTION

This invention relates to First-In-First-Out (FIFO) memory devices, and more particularly to FIFO memory devices that interface a port to a data receiving device.

BACKGROUND OF THE INVENTION

First-In-First-Out (FIFO) memory devices are widely used to store data. FIFO memory devices generally include one or more FIFO memory blocks. In a FIFO memory block, data generally is stored in sequential order as data is written into the memory block. The FIFO memory block typically is sequentially read in the same order as it was written. Thus, the data that is first written into the FIFO device is also the data that is first read from the FIFO device.

FIFO memory devices are widely used to buffer data in network applications. In network applications, data packets may be stored in the FIFO memory device in the sequential order that they are written. For routing or distribution, the data is sequentially read starting from the first data that was written.

A FIFO memory block may be used in a FIFO memory device that interfaces a port to a data receiving device. One important application of FIFO memory devices is under a specification known as the Universal Test and Operation Physical (PHY) Interface for Asynchronous Transfer Mode (ATM) specification or the UTOPIA specification. The UTOPIA specification defines an interface between one or more ports and an ATM device. In this application, the FIFO memory device synchronizes input and output of data between relatively slow physical devices and a relatively high speed ATM device.

For example, an integrated circuit FIFO memory device is marketed by Integrated Device Technology, Inc., the assignee of the present application, as Device IDT77105. See the Data Sheet entitled *"PHY (TC-PMD) for 25.6 and 51.2 Mbps ATM Networks"*, IDT77105, December 1998. The IDT77105 supports Asynchronous Transfer Mode (ATM) data communications and networking. The IDT77105 provides the Transmission Convergence (TC) and Physical Media Dependent (PMD) layers of a 25.6 or 51.2 Mbps physical interface suitable for ATM networks using Unshielded Twisted Pair (UTP) Category 3 (or better) wiring.

FIG. 1 is a block diagram of a conventional FIFO memory device, such as the one used in the IDT77105. As shown in FIG. 1, the FIFO memory device 100 includes a data input interface 102 that is coupled to an input port 106, such as a serial port. A data output interface 104 is coupled to a data receiving device 108, such as an ATM device. A FIFO memory block 110 is also provided. The data input interface 102 and the data output interface 104 generally operate at different clock speeds and generally operate asynchronously from one another.

Still continuing with the description of FIG. 1, the data input interface 102 includes a clock recovery circuit 112 that recovers a clock from a serial data signal, to generate a data signal 114 and a recovered clock 116. A cell assembly circuit 118 assembles the data into cells and writes the cells into the FIFO 110 one byte at a time. For example, under the UTOPIA specification, cells having 53 bytes of data may be assembled. The cell assembly circuit writes data into the FIFO 110. In FIG. 1, the FIFO 110 can hold three cells C1–C3, although in general, the FIFO may be configured to hold fewer or more cells. A first counter 122 counts the number of cells that are in the FIFO 110 under control of a first controller 124. More specifically, when a cell is written into the FIFO 110, the first controller provides an enable signal to the UP input of the first counter 122, so that the first counter 122 increments the count. The count is also fed back to the first controller 124.

The data output interface 104 includes a parallel output interface 130 that is responsive to data that is read from the FIFO 110 provide the data that is read from the FIFO 110 to the data receiving device 108. A second counter 132 is provided to count the number of cells that are in the FIFO 110. The second counter 132 is controlled by a second controller 134. When a cell is read from the FIFO 110, the second controller 134 provides an enable signal to the down (DN) input of the second counter 132 to decrement the count. The count is also fed back to the second controller 134. The parallel output interface 130, the second counter 132 and the second controller 134 are synchronized by a data output interface clock 136 that may be provided from external of the FIFO memory device 100. As shown in FIG. 1, the data output interface clock 136 is independent of the recovered clock 116.

Since the data input interface 102 and the data output interface 104 operate asynchronously, it is desirable to synchronize the first counter 122 and the second counter 132, so that each counter accurately reflects the number of cells in the FIFO 110, notwithstanding the different clock frequencies of the data input interface recovered clock 116 and the data output interface clock 136. In order to provide this synchronization, a first pulse generator 150 is provided in the data input interface 102, and a second pulse generator 160 is provided in the data output interface 104. Upon incrementing the first counter 122, the first controller 124 also enables the first pulse generator 150 to generate a pulse that is provided to the UP input of the second counter 132. Thus, the second counter increments its count in response to the first pulse 152 from the first pulse generator 150. Similarly, upon enabling the second counter 132 for decrementing by the second controller 134, the second controller also enables the second pulse generator 160 to provide a second pulse 162 to the down (DN) input of the first counter 122. Thus, when a cell is written into the FIFO 110, the first pulse generator 150 causes the second counter 132 to increment. When a cell is read from the FIFO 110, the second pulse generator 160 causes the first counter 122 to decrement.

Since the data input interface 102 and the data output interface 104 operate at different clock frequencies, and may be selectively enabled and disabled by the respective input port 106 and the data receiving device 108, it is desirable to ensure that the first and second counters 122 and 132 are able to respond to the second pulse 162 and first pulse 152 respectively, so that an accurate count is maintained. In order to ensure that the first and second counters can respond to the pulses, a multiple cycle pulse is generally provided by the first pulse generator 150 and the second pulse generator 160, so that the respective second counter 132 and first counter 122 can sample the pulses, and thereby increment or decrement the counter.

Unfortunately, the need to ensure that the pulses are sampled may place operating constraints on the clock frequency of the data input interface 102 and/or the data output interface 104. The need to provide a multiple cycle pulse may also reduce the overall operational speed of the FIFO memory device 100. Moreover, notwithstanding the provision of wide pulses, it may not be ensured that the first or second counter 122 or 124 will be active during the pulse interval. Inaccurate counts may therefore be produced.

These problems are illustrated in FIG. 2 which is a timing diagram of operations of a FIFO memory device 100 of FIG. 1. As shown in FIG. 2, the recovered clock 116 may have a predetermined frequency. The first pulse is output in synchronism with the recovered clock 116. In order to ensure that the second counter 132 can sample the first pulse 152, a constraint may need to be placed on the clock frequency of the data output interface clock 136, so that it is sufficiently high frequency to ensure that the first pulse 152 is sampled. Moreover, since the data output interface 104 may be placed in an inactive mode by the data receiving device 108, it may not be ensured that the first pulse 152 will be detected, notwithstanding constraints that are placed on the clock frequency. Similar considerations apply to the second pulse 162 and the first counter 122.

SUMMARY OF THE INVENTION

It is therefore an object of the present invention to provide improved FIFO memory devices and methods for interfacing a port to a data receiving device.

It is another object of the present invention to provide FIFO memory devices and methods that can ensure accurate counts of cells that are written in and read from the FIFO memory, notwithstanding the asynchronous operation of the data input interface and the data output interface thereof.

It is yet another object of the present invention to provide FIFO memory devices and methods that need not constrain the clock frequencies of a data input interface and a data output interface that operate asynchronously.

It is still another object of the present invention to provide FIFO memory devices and methods that can provide accurate counts of cells written into and read from a FIFO memory, notwithstanding that the data input interface and/or the data output interface are inactive.

These and other objects are provided, according to the present invention, by a FIFO memory device that includes a FIFO memory block, a data input interface that writes data into the FIFO memory block in synchronization with a first clock, and a data output interface that reads the data from the FIFO memory block in synchronization with a second clock. The data input interface provides a first indication to the data output interface that the received data has been written into the FIFO memory block. The first indication persists until reset by the data output interface. The data output interface provides a second indication to the data input interface that the received data has been read from the FIFO memory block. The second indication persists until reset by the data input interface.

By providing the first and second indications between the data input interface and the data output interface that persist until reset, the first and second data interfaces may always be aware that a cell has been written into or read from the FIFO. Thus, timing constraints need not be placed between the first and second clocks in order to ensure that an accurate count of cells in the FIFO is maintained by the data input interface and the data output interface. Moreover, the first and second indications persist notwithstanding the deactivation of the data input interface and/or the data output interface. Thus, upon reactivation, an accurate count of cells in the FIFO may be obtained.

More specifically, FIFO memory devices according to the invention interface a port to a data receiving device. The FIFO memory devices include a FIFO memory block. A data input interface is coupled to the port and to the FIFO memory block. The data input interface receives data from the port, assembles the received data into cells, and writes the cells into the FIFO memory block. A data input interface includes a first counter that counts the number of cells that are written into the FIFO memory block. The data output interface is coupled to the FIFO and to the data receiving device. The data output interface reads the cells from the FIFO memory block and provides the cells to the data receiving device. The data output interface includes a second counter that counts the number of cells that are read from the FIFO memory block.

A first register is coupled between the data input interface and the second counter, to store therein a first indication that a cell has been written into the FIFO memory block. The second counter is responsive to the first indication to increment the number of cells that are written into the FIFO memory block. A second register is coupled between the data output interface and the first counter, to store therein a second indication that a cell has been read from the FIFO memory block. The first counter is responsive to the second indication to decrement the number of cells that are read from the FIFO memory block.

In a first embodiment of the present invention, the first register comprises a first latch including a first set input, a first clear input and a first output. The first set input is coupled to the data input interface. The first clear input is coupled to the data output interface and the first output is coupled to the second counter. The second register comprises a second latch including a second set input, a second clear input and a second output. The second set input is coupled to the data output interface. The second clear input is coupled to the data input interface and the second output is coupled to the first counter.

In another embodiment of the present invention, the first register comprises a third counter including a first increment input, a first clear input and a first output. The first increment input is coupled to the data input interface. The first clear input is coupled to the data output interface and the first output is coupled to the second counter. The second register comprises a fourth counter including a second increment input, a second clear input and a second output. The second increment input is coupled to the data output interface. The second clear input is coupled to the data input interface and the second output is coupled to the first counter. Accordingly, the first and second registers, whether embodied as latches, counters or other storing means, provide a count of cells in the FIFO from the data input interface to the data output interface and from the data output interface to the data input interface that persist until reset by the data output interface and the data input interface respectively. Thus, the need to tailor the clock frequencies to ensure sampling of pulses may be eliminated, and an accurate count may be obtained notwithstanding that the data input interface and/or the data output interface may be inactive.

In a preferred embodiment of the present invention, the data input interface includes a clock recovery circuit that is responsive to the port, to recover a clock from the data that is received at the port. A cell assembly unit is responsive to the clock recovery unit and is coupled to the FIFO memory block, to assemble the received data into cells and to write the cells into the FIFO memory block. A controller is responsive to the clock recovery circuit and/or to the cell assembly circuit, to increment the first counter and to provide the first indication to the first register upon storing a cell in the FIFO memory block. The port may be a serial port, and the data receiving device may be an ATM device. It will also be understood that the counters and registers may be responsive to bits, bytes, groups of bits and/or groups of bytes that are written into or read from the FIFO memory block, rather than being responsive to cells of 53 or other predetermined numbers of bytes.

Methods of interfacing a port to a data receiving device using a FIFO memory and first and second counters according to the invention include the steps of receiving data from the port, assembling the received data into cells, writing the cells into the memory, reading the cells from the FIFO memory and providing the read cells from the FIFO memory to the data receiving device. A first indication that a cell has been written into the FIFO memory is stored. The second counter is incremented in response to the step of storing a first indication. A second indication that a cell has been read from the FIFO memory is also stored and the first counter is decremented in response to the step of storing the second indication. Accordingly, the performance and/or accuracy of FIFO memory devices may be improved.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
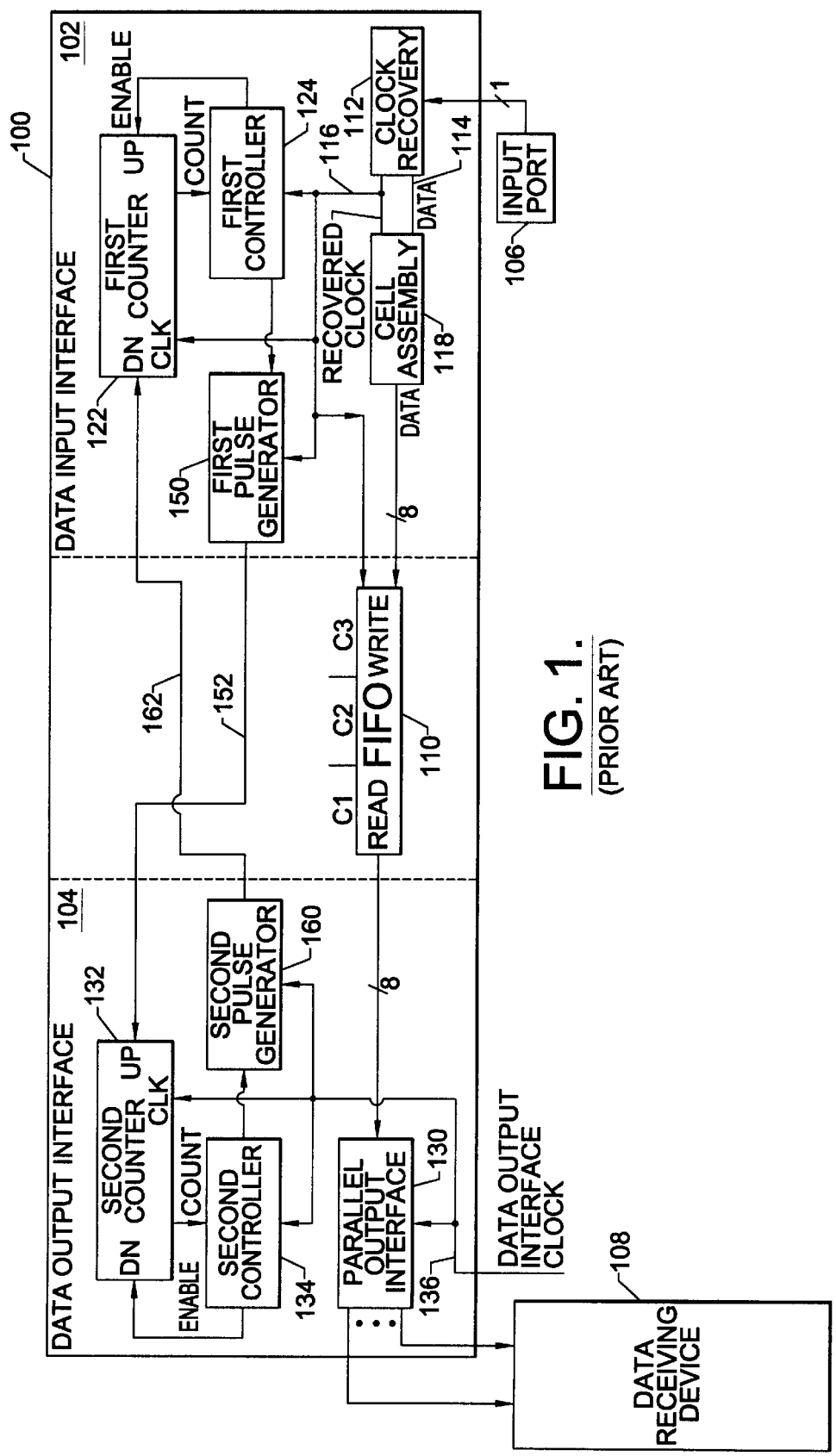
FIG. 1 is a block diagram of a conventional FIFO memory device.
Figure 2:
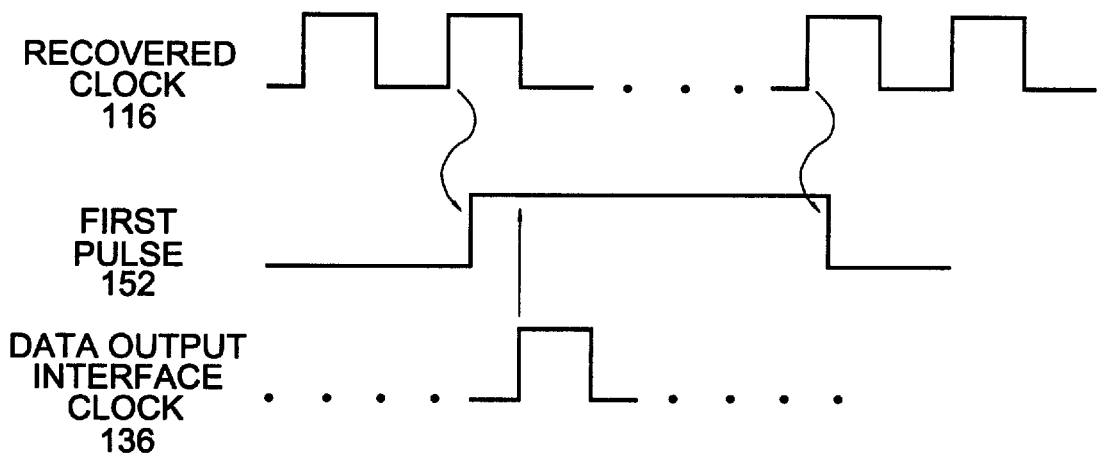
FIG. 2 is a timing diagram illustrating operations of a FIFO memory device of FIG. 1.
Figure 3:
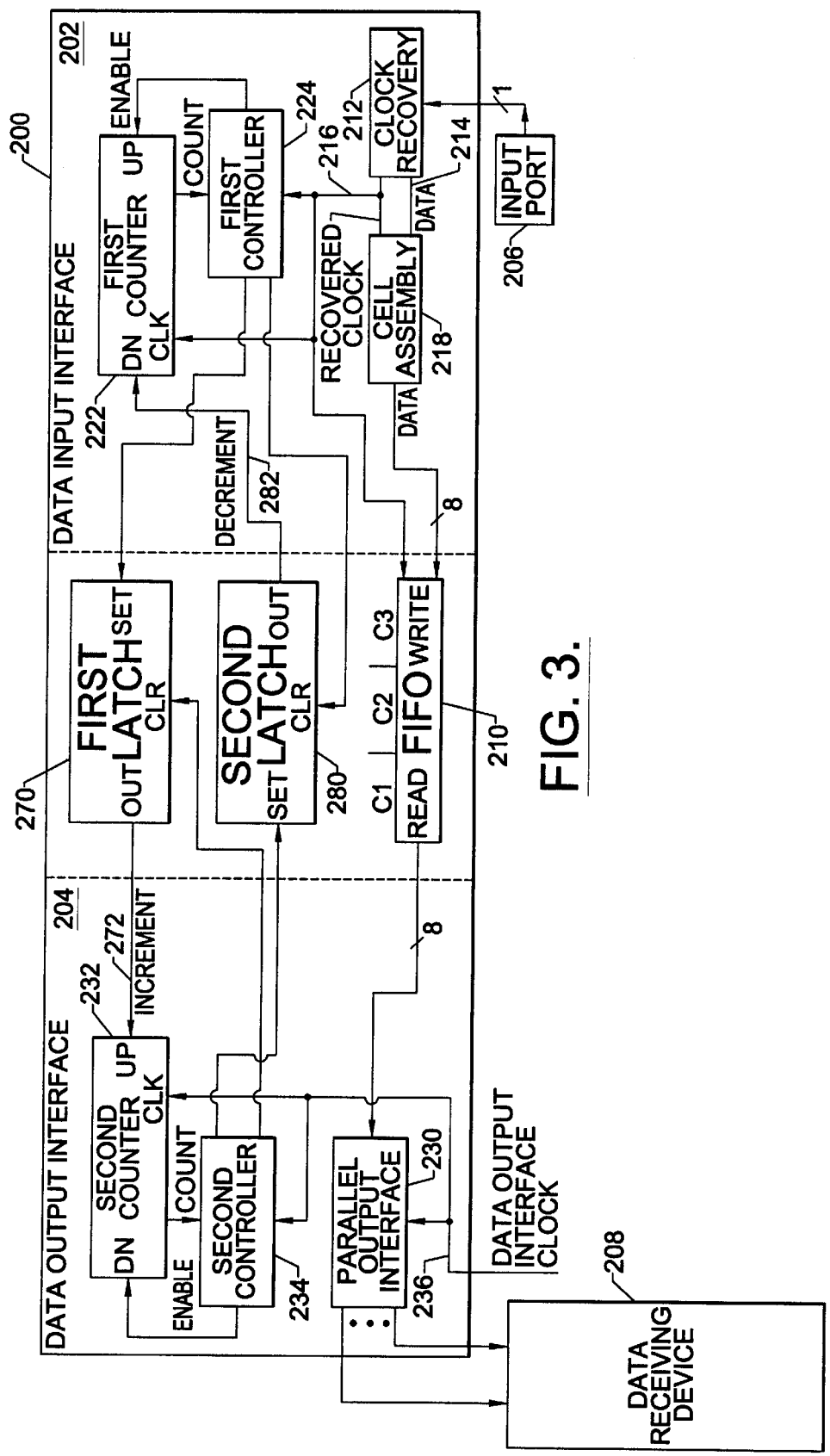
FIG. 3 is a block diagram of first embodiments of FIFO memory devices according to the present invention.

FIG. 3 is a block diagram of first embodiments of FIFO memory devices according to the present invention. As shown in FIG. 3, a FIFO memory device 200 includes a data input interface 202 that is coupled to an input port 206, such as a serial port. A data output interface 204 is coupled to a data receiving device 208, such as an ATM device. A FIFO memory block 210 is also provided. The data input interface 202 and the data output interface 204 generally operate at different clock speeds and generally operate asynchronously from one another.

Still continuing with the description of FIG. 3, the data input interface 202 includes a clock recovery circuit 212 that recovers a clock from a serial data signal, to generate a data signal 214 and a recovered clock 216. A cell assembly circuit 218 assembles the data into cells. For example, under the UTOPIA specification, cells having 53 bytes of data may be assembled. The cell assembly circuit writes data into the FIFO 210. In FIG. 3, the FIFO 210 can hold three cells C1–C3, although the FIFO may be configured to hold fewer or more cells. A first counter 222 counts the number of cells that are written into the FIFO 210 under control of a first controller 224. More specifically, when a cell is written into the FIFO 210, the first controller provides an enable signal to the UP input of the first counter 222, so that the first counter 222 increments the count. The count is also fed back to the first controller 224.

The data output interface 204 includes a parallel output interface 230 that is responsive to data that is read from the FIFO 210 to provide the data that is read from the FIFO 210 to the data receiving device 208. A second counter 232 is provided to count the number of cells that are read from the FIFO 210. The second counter 232 is controlled by second controller 234. When a cell is read from the FIFO 210, the second controller 234 provides an enable signal to the down (DN) input of the second counter 232 to decrement the count. The count is also fed back to the second controller 234. The parallel output interface 230, the second counter 232 and the second controller 234 are synchronized by a data output interface clock 236 that may be provided from a source external to the FIFO memory device 200. As shown in FIG. 3, the data output interface clock 236 is independent of the recovered clock 216.

Still referring to FIG. 3, a first register, such as a first latch 270 is coupled between the data input interface 202 and the second counter 232. The first register 270 stores therein a first indication that a cell has been written into the FIFO memory block 210. The second counter 232 is responsive to the first indication 272 to increment the number of cells that are written into the FIFO memory block 210. A second register, such as a second latch 280 is coupled between the data output interface 204 and the first counter 222. The second latch 280 stores therein a second indication that a cell has been read from the FIFO memory block 210. The first counter 222 is responsive to the second indication 282 to decrement the number of cells that are read from the FIFO memory block.

More specifically, as shown in FIG. 3, the first latch 270 may comprise an SR flip-flop that includes a first SET input, a first clear input CLR and a first output OUT. The first SET input is coupled to the data input interface 202. The first clear input CLR is coupled to the data output interface 204, and the first output OUT is coupled to the second counter 232. The second latch 280 includes a second SET input, a second clear input CLR and a second output OUT. The second SET input is coupled to the data output interface 204. The second clear input CLR is coupled to the data input interface 202 and the second output OUT is coupled to the first counter 222.

Even more specifically, the first controller 224 writes a cell into the FIFO 210 and increments the first counter by providing an enable signal to the UP input of the first counter 222. When the second controller 234 reads a cell from the FIFO 210 and decrements the second counter 232 by applying an enable signal to the down input DN of the second counter 232, it also sets the second latch 280. Thus, the first counter 222 is responsive to setting of the second latch 280 to decrement the count of cells in the FIFO in response to the decrement signal 282 that is produced by the output OUT of the second latch 280. After the first controller 224 samples the latch 280 and decrements the first counter 222, it then clears latch 280. Since the second latch is set and cleared asynchronously, the second controller 234 can set the second latch when a cell is read, and the first counter 222 can be decremented when the data input interface 202 is activated. Reliance on coordination of sampling of a pulse need not be provided.

Similarly, when the first controller 234 indicates that a cell has been written into the FIFO 210 by providing an enable signal to the UP input of the first counter 222, the first controller also sets the first latch 270. When the data output interface 204 is active, the output OUT of the first latch 270 provides an increment signal 272 so that the second counter 232 is incremented, and thereby provides a reliable count of the number of cells in the FIFO 210. Thus, setting and clearing of the first latch 270 and the second latch 280 may be performed asynchronously and need not rely on sampling of a pulse.

Stated differently, each controller 224 and 234 sets one latch 270 and 280 and clears the other latch 280 and 270 respectively. This "handshake" can reduce and preferably eliminate the clock frequency dependence of the increment and decrement signals 272 and 282.

Figure 4:
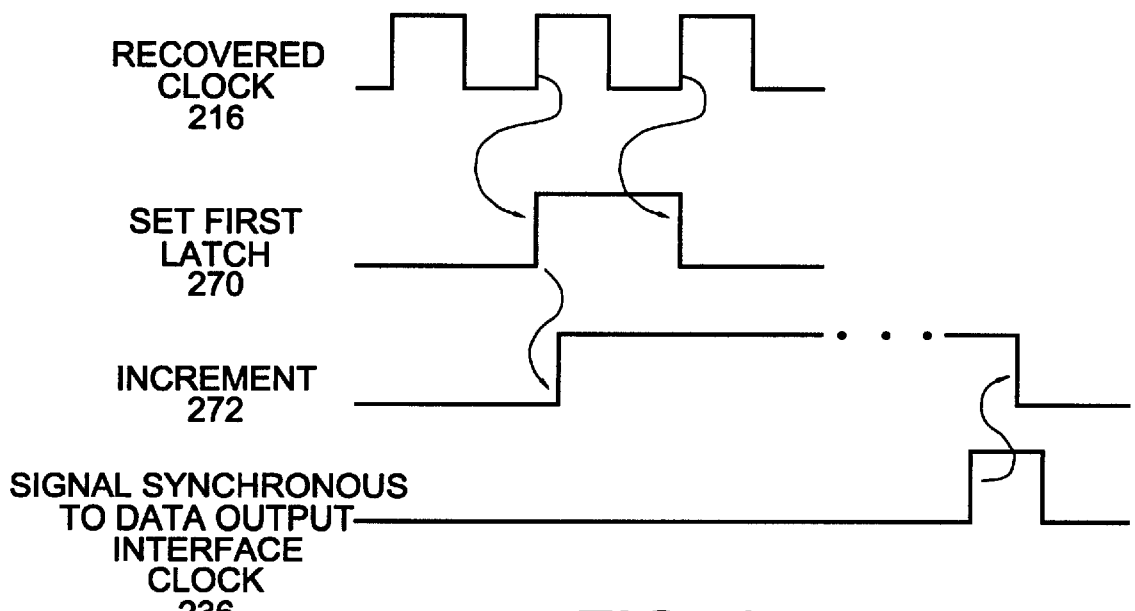
FIG. 4 is a timing diagram illustrating operations of FIFO memory devices of FIG. 3.

FIG. 4 is a timing diagram illustrating the above-described operations of FIG. 3. As shown in FIG. 4, the first latch 270 is set by the first controller 224 in synchronization with the recovered clock 216. The first latch 270 produces the increment signal 272. However, the second counter 232 is incremented by the second controller 234 in synchronization with the data output interface clock 236 any time after the first latch 270 was set. No timing requirement need be placed on the period of the data output interface clock 236. After the second counter 232 is incremented, the second controller 234 then resets the first latch 270. Similar operations may be performed with respect to the second latch 280.

Figure 5:
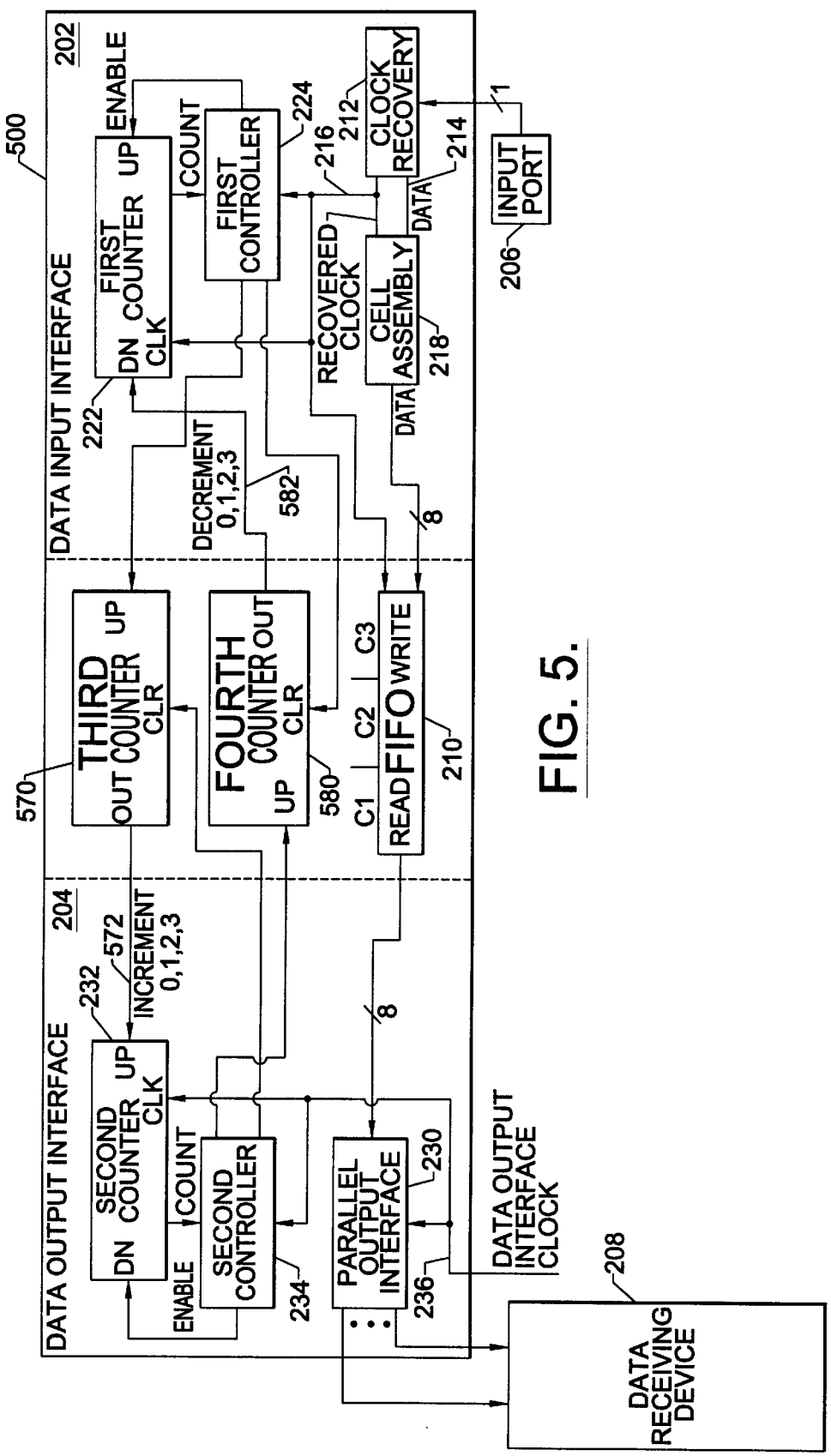
FIG. 5 is a block diagram of second embodiments of FIFO memory devices according to the present invention.

In the embodiments of FIGS. 3 and 4, it may be difficult to determine whether more than one cell has been written into or read from the FIFO 210. FIFO memory devices 500 of FIG. 5 use asynchronous counters 570 and 580 instead of the first and second latches 270 and 280 of FIG. 3, to thereby provide an indication that data has been written into the FIFO memory block and read from the FIFO memory block, as well as an indication of the number of cells of data that have been written or read. More specifically, as shown in FIG. 5, the first register comprises a third counter 570 and the second register comprises a fourth counter 580. The third and fourth counters 570 and 580 preferably are asynchronous (unclocked) counters that retain their counts until incremented or cleared.

The third counter 570 includes a first increment input UP, a first clear input CLR and a first output OUT. The first increment input UP is coupled to the data input interface 222 and more specifically to the first controller 224. The first clear input CLR is coupled to the data output interface 204 and more specifically to the second controller 234. The first output is coupled to the second counter 232. Thus, when a cell is written into the FIFO 210, the first controller 224 increments the third counter 570. The third counter 570 provides an indication 572 that is a count of the number of cells that have been written. In FIG. 5, this count is represented by 0, 1, 2 and 3. Thus, the indication 572 provides an indication that a cell was written and also provides a count of the number of cells that were written.

Similarly, the fourth counter 580 includes a second increment input UP, a second clear input CLR and a second output OUT. The second increment input UP is coupled to the data output interface 204 and more specifically to the second controller 234. The second clear input CLR is coupled data input interface 202 and more specifically to the first controller 224. The second output OUT is coupled to the first counter 222.

FIG. 5 operates in a manner similar to FIG. 4, except that the single bit that is latched in the latches 270 and 280 is replaced by a multibit count in asynchronous counters 570 and 580. These counters can track multiple increments from the data input interface 202, even when the data output interface is inactive, and multiple decrements from the data output interface 204, even when the data input interface is inactive.

Figure 6:
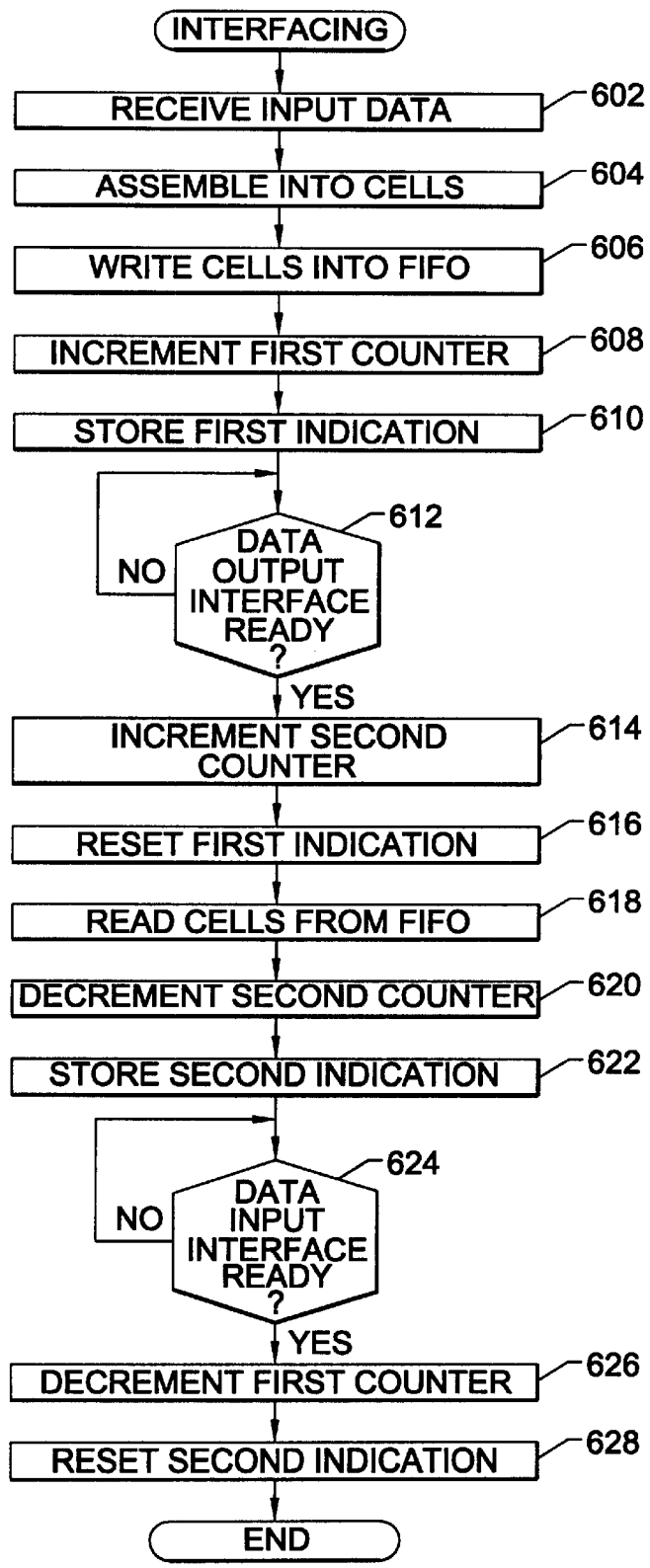
FIG. 6 is a flowchart illustrating operations for interfacing a port to a data receiving device using a FIFO memory according to the present invention.

Referring now to FIG. 6, operations for interfacing a port to a data receiving device using a FIFO memory according to the present invention will now be described. It will be understood that these operations may be performed by devices according to FIG. 3 or 5, and also may be performed by other devices.

Referring now to FIG. 6, input data is received at Block 602, for example by clock recovery circuit 212. The input data is assembled into cells at Block 604, for example by cell assembly circuit 218. The cells are written into the FIFO 210 at Block 606. The first counter 222 is incremented by the first controller 224 at Block 608. The first indication is stored in the first latch 270 or in the third counter 570 by the first controller 224 at Block 610.

Operations then wait at Block 612 until the data output interface 204 is ready. When the data output interface is ready, the first indication is read by the second counter 232 and the second counter is incremented at Block 614. The first indication 270 or 570 is then reset by the second controller 234 at Block 616. Cells are read from the FIFO by the parallel output interface 230 at Block 618. The second counter 232 is decremented by the second controller 234 at Block 620. The second indication is then stored in the second latch 280 or the fourth counter 580 by the second controller 234 at Block 622.

Operations then wait at Block 624 until the data input interface 202 is ready. Then, at Block 626, the second indication 282 or 582 is read and the first counter 222 is decremented. The second indication 280 or 580 is then resent at Block 628. Accordingly, accurate counts of the number of cells written into and read from a FIFO may be maintained by both the data input interface and the data output interface, notwithstanding their asynchronous operations.

Various aspects of the present invention were illustrated in detail in the figures. Blocks of the figures support combinations of means for performing the specified functions, combinations of steps for performing the specified functions and program instruction means for performing the specified functions. It will also be understood that individual blocks of the figures, and combinations of blocks in the flowchart illustrations, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A First-in-First-Out (FIFO) memory device that interfaces a port to a data receiving device, the FIFO memory device comprising:

a FIFO memory block;

a data input interface that is coupled to the port and to the FIFO memory block, to receive data from the port, assemble the received data into cells, and write the cells into the FIFO memory block, the data input interface including a first counter that counts the number of cells that are written into the FIFO memory block;

a data output interface that is coupled to the FIFO and to the data receiving device, to read the cells from the FIFO memory block and provide the cells to the data receiving device, the data output interface including a second counter that counts the number of cells that are read from the FIFO memory block;

a first register that is coupled between the data input interface and the second counter, to store therein a first indication that a cell has been written into the FIFO memory block, the second counter being responsive to the first indication to increment the number of cells that are written into the FIFO memory block; and a second register that is coupled between the data output interface and the first counter, to store therein a second indication that a cell has been read from the FIFO memory block, the first counter being responsive to the second indication to decrement the number of cells that are read from the FIFO memory block;

wherein the first register comprises a third counter including a first increment input, a first clear input and a first output, wherein the first increment input is coupled to the data input interface, the first clear input is coupled to the data output interface and the first output is coupled to the second counter; and wherein the second register comprises a fourth counter including a second increment input, a second clear input and a second output, wherein the second increment input is coupled to the data output interface, the second clear input is coupled to the data input interface and the second output is coupled to the first counter.

2. A First-In-First-Out (FIFO) memory device that interfaces a port to a data receiving device, the FIFO memory device comprising:

a FIFO memory block;

a data input interface that is coupled to the port and to the FIFO memory block, to receive data from the port, assemble the received data into cells, and write the cells into the FIFO memory block, the data input interface including a first counter that counts the number of cells that are written into the FIFO memory block;

a data output interface that is coupled to the FIFO and to the data receiving device, to read the cells from the FIFO memory block and provide the cells to the data receiving device, the data output interface including a second counter that counts the number of cells that are read from the FIFO memory block;

a first register that is coupled between the data input interface and the second counter, to store therein a first indication that a cell has been written into the FIFO memory block, the second counter being responsive to the first indication to increment the number of cells that are written into the FIFO memory block; and a second register that is coupled between the data output interface and the first counter, to store therein a second indication that a cell has been read from the FIFO memory block, the first counter being responsive to the second indication to decrement the number of cells that are read from the FIFO memory block;

wherein the data input interface comprises:

a clock recovery circuit that is responsive to the port, to recover a clock from the data that is received at the port;

a cell assembly circuit that is responsive to the clock recovery circuit and is coupled to the FIFO memory block, to assemble the received data into cells and to write the cells into the FIFO memory block; and a controller that is responsive to one of the clock recovery circuit and the cell assembly circuit, to increment the first counter and to provide the first indication to the first register upon storing a cell in the FIFO memory block.

3. A FIFO memory device according to claim 1 wherein the port is a serial port and wherein the data receiving device is an Asynchronous Transfer Mode (ATM) device.

4. A First-In-First-Out (FIFO) memory device comprising:

a FIFO memory block;

a first counter that counts data that is written into the FIFO memory block;

a second counter that counts data that is read from the FIFO memory block;

a first register that is coupled to the second counter, to store therein a first indication that data has been written into the FIFO memory block, the second counter being responsive to the first indication to increment the count of data that is written into the FIFO memory block; and a second register that is coupled to the first counter, to store therein a second indication that data has been read from the FIFO memory block, the first counter being responsive to the second indication to decrement the count of data that is read from the FIFO memory block;

wherein the first register comprises a third counter and wherein the second register comprises a fourth counter.

5. A First-In-First-Out (FIFO) memory device comprising:

FIFO memory means;

first means for counting data that is written into the FIFO memory means;

second means for counting data that is read from the FIFO memory means;

first means for storing a first indication that data has been written into the FIFO memory means, the second means for counting being responsive to the first indication to increment the count of data that is written into the FIFO memory means; and second means for storing a second indication that data has been read from the FIFO memory means, the first means for counting being responsive to the second indication to decrement the count of data that is read from the FIFO memory means;

wherein the first means for storing comprises third means for counting and wherein the second means for storing comprises fourth means for counting.

* * * * *